(12) United States Patent
Shaw et al.

(10) Patent No.: US 11,693,819 B2
(45) Date of Patent: Jul. 4, 2023

(54) CLOUD-NATIVE GLOBAL FILE SYSTEM WITH MULTI-SITE SUPPORT USING PUSH CLASSES

(71) Applicant: Nasuni Corporation, Boston, MA (US)

(72) Inventors: David M. Shaw, Newton, MA (US); Andres Rodriguez, Boston, MA (US)

(73) Assignee: Nasuni Corporation, Boston, MA (US)

( * ) Notice: Subject to any disclaimer, the term of this patent is extended or adjusted under 35 U.S.C. 154(b) by 0 days.

(21) Appl. No.: 17/707,547

(22) Filed: Mar. 29, 2022

(65) Prior Publication Data

US 2022/0405238 A1 Dec. 22, 2022

Related U.S. Application Data

(63) Continuation of application No. 16/578,489, filed on Sep. 23, 2019, now Pat. No. 11,288,233, which is a
(Continued)

(51) Int. Cl.
*G06F 16/11* (2019.01)
*G06F 9/54* (2006.01)
(Continued)

(52) U.S. Cl.
CPC ............ *G06F 16/128* (2019.01); *G06F 9/542* (2013.01); *G06F 16/144* (2019.01); *G06F 16/17* (2019.01);
(Continued)

(58) Field of Classification Search
CPC ...... G06F 16/128; G06F 16/17; G06F 16/144; G06F 16/182; G06F 16/1873; G06F 16/907; G06F 9/542
(Continued)

(56) References Cited

U.S. PATENT DOCUMENTS

| 8,661,063 B2 * | 2/2014 | Mason, Jr ........... G06F 16/1873 707/802 |
| 8,972,353 B1 * | 3/2015 | Sharma ............... G06F 11/1456 707/649 |

(Continued)

FOREIGN PATENT DOCUMENTS

WO    WO 2016/085541 A1 *  6/2016 ............. G06F 17/30

OTHER PUBLICATIONS

Harter, Tyler, et al., "Slacker: Fast Distribution with Lazy Locker Containers", FAST '16, Santa Clara, CA, Feb. 22-25, 2016, pp. 181-195.*

*Primary Examiner* — Robert Stevens
(74) *Attorney, Agent, or Firm* — David H. Judson (57) ABSTRACT

A technique for data sharing among multiple filers that share a volume in a private or public cloud object store is implemented. In this approach, a mechanism is provided to enable a local filer to determine whether other filers that are sharing the volume have a consistent view of new data being written to the cloud object store by the local filer. The begins by associating together a collection of one or more files in a "push class." On demand, a push operation for the push class is initiated on the local filer. Preferably, the push is managed according to one or more push criteria associated with the push class. Typically, the push operation pushes file data and metadata associated with the one or more files of the push class in respective phases, with the file data being pushed to the cloud during a first phase and the metadata associated with that file data being pushed during a second phase that follows the first phase. After the push operation completes, a determination is made whether the new version of the file is available at one or more other filers that share the volume.

12 Claims, 4 Drawing Sheets

Related U.S. Application Data continuation of application No. 16/043,194, filed on Jul. 24, 2018, now Pat. No. 10,423,573.

(51) Int. Cl.
    *G06F 16/17*         (2019.01)
    *G06F 16/14*         (2019.01)
    *G06F 16/182*       (2019.01)
    *G06F 16/907*       (2019.01)
    *G06F 16/18*         (2019.01)

(52) U.S. Cl.
    CPC ........ *G06F 16/182* (2019.01); *G06F 16/1873* (2019.01); *G06F 16/907* (2019.01)

(58) Field of Classification Search
    USPC .......................................................... 707/705
    See application file for complete search history.

(56) References Cited

U.S. PATENT DOCUMENTS

| | | | |
|---|---|---|---|
| 9,235,596 B2 * | 1/2016 | Mason, Jr | G06F 16/1774 |
| 2010/0169591 A1 * | 7/2010 | Atluri | G06F 11/1448 |
| | | | 711/E12.001 |
| 2013/0185258 A1 * | 7/2013 | Bestler | G06F 16/1844 |
| | | | 707/638 |
| 2014/0324929 A1 * | 10/2014 | Mason, Jr | G06F 16/1774 |
| | | | 707/827 |
| 2018/0260125 A1 * | 9/2018 | Botes | G06F 3/065 |

* cited by examiner

CLOUD-NATIVE GLOBAL FILE SYSTEM WITH MULTI-SITE SUPPORT USING PUSH CLASSES

BACKGROUND OF THE INVENTION

Technical Field

This application relates generally to data storage.

Background of the Related Art

It is known to provide a cloud-native global file system that is used to provide primary file storage for enterprise data. In this approach, edge appliances (or "filers") typically located on-premises securely transmit all files, file versions and metadata to a preferred private or public cloud object store, while locally caching only active files. The appliances are stateless, and multiple appliances can mount the same volume in the cloud. As files are written locally, an authoritative copy of every file and metadata (inodes) are stored in the cloud. The system provides a single, unified namespace for all primary file data that is not bound by local hardware or network performance constraints. The above-described approach to enterprise file services also has been extended to provide multiple-site/multiple-filer access to the same namespace, thereby enabling participating users with the ability to collaborate on documents across multiple filers/sites. A system of this type is available commercially from Nasuni® Corporation of Boston, Mass.

In a multi-site shared volume often one or more files must be pushed from a source filer to one or many target filers that share the volume. In this context, the operator of the source filer must be able to determine when those files have arrived at the targets. The techniques of this disclosure address these requirements.

BRIEF SUMMARY

According to this disclosure, a technique for data sharing among multiple filers that share a volume in a private or public cloud object store is implemented. In this approach, a mechanism is provided to enable a local filer to determine whether other filers that are sharing the volume have a consistent view of new or modified data being written to the cloud object store by the local filer. The begins by associating together a collection of files in a "push class." A push class may be as small as a single file, or a single directory (recursive or not), or it may be defined by a pattern to follow (e.g., "all *.jpg files under the /pictures/directory," "all files written in the past hour," or the like). Upon a given occurrence, e.g., when data being written should be seen on other filers, a push operation for the push class is initiated on the local filer. This operation is referred to herein as a push class snapshot. Preferably, the push is managed according to one or more push criteria associated with the push class. Typically, the push operation pushes file data and metadata associated with the one or more files of the push class in respective phases, with the file data being pushed to the cloud during a first phase and the metadata associated with that file data being pushed during a second phase that follows the first phase. The file data itself is sometimes referred to as a "payload," and preferably the push occurs during a snapshot of the volume. After the push operation completes, the local filer then determines whether the new version of the file is available at one or more other filers that share the volume. This determination may be made in several ways.

In a preferred approach, the other filers are queried for a push version of metadata associated with the push class. A remote filer that receives this query then queries (its own database) to identify the push version of a root of the volume. When (at the remote filer) the volume root is at or above the push version, a response to that effect is returned to the query, and this response indicates to the local filer that the current version of the file being written is already present at the remote filer. In an alternative version, after a metadata push is initiated from the local filer, the local filer queries the remote filer(s) for a payload identifier associated with the push class. Depending on the value of the payload identifier returned from a remote filer, the local filer determines whether the new version of the file being written is present there.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
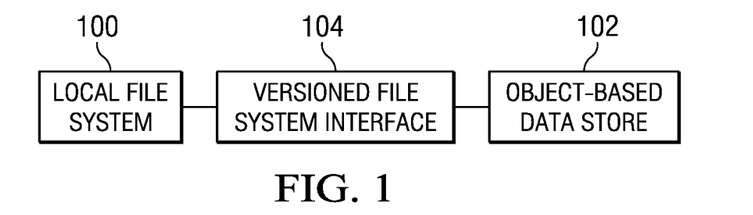
FIG. 1 is a block diagram illustrating how a known versioned file system interfaces a local file system to an object-based data store.

FIG. 1 illustrates a local file system 100 and an object-based data store 102. Although not meant to be limiting, preferably the object-based data store 102 is a "write-once" store and may comprise a "cloud" of one or more storage service providers. An interface 104 (or "filer") provides for a "versioned file system" that only requires write-once behavior from the object-based data store 102 to preserve substantially its "complete" state at any point-in-time. As used herein, the phrase "point-in-time" should be broadly construed, and it typically refers to periodic "snapshots" of the local file system (e.g., once every "n" minutes). The value of "n" and the time unit may be varied as desired. The interface 104 provides for a file system that has complete data integrity to the cloud without requiring global locks. In particular, this solution circumvents the problem of a lack of reliable atomic object replacement in cloud-based object repositories. The interface 104 is not limited for use with a particular type of back-end data store. When the interface is positioned in "front" of a data store, the interface has the effect of turning whatever is behind it into a "versioned file system" ("VFS"). The VFS is a construct that is distinct from the interface itself, and the VFS continues to exist irrespective of the state or status of the interface (from which it may have been generated). Moreover, the VFS is self-describing, and it can be accessed and managed separately from the back-end data store, or as a component of that data store. Thus, the VFS (comprising a set of structured data representations) is location-independent. In one embodiment, the VFS resides within a single storage service provider (SSP) although, as noted above, this is not a limitation. In another embodiment, a first portion of the VFS resides in a first SSP, while a second portion resides in a second SSP. Generalizing, any given VFS portion may reside in any given data store (regardless of type), and multiple VFS portions may reside across multiple data store(s). The VFS may reside in an "internal" storage cloud (i.e. a storage system internal to an enterprise), an external storage cloud, or some combination thereof.

The interface 104 may be implemented as a machine. A representative implementation is the Nasuni® Filer, available from Nasuni® Corporation of Boston, Mass. Thus, for example, typically the interface 104 is a rack-mounted server appliance comprising hardware and software. The hardware typically includes one or more processors that execute software in the form of program instructions that are otherwise stored in computer memory to comprise a "special purpose" machine for carrying out the functionality described herein. Alternatively, the interface is implemented as a virtual machine or appliance (e.g., via VMware®, or the like), as software executing in a server, or as software executing on the native hardware resources of the local file system. The interface 104 serves to transform the data representing the local file system (a physical construct) into another form, namely, a versioned file system comprising a series of structured data representations that are useful to reconstruct the local file system to any point-in-time. A representative VFS is the Nasuni Unity File System (UniFS™). Although not meant to be limiting, preferably each structured data representation is an XML document (or document fragment). As is well-known, extensible markup language (XML) facilitates the exchange of information in a tree structure. An XML document typically contains a single root element (or a root element that points to one or more other root elements). Each element has a name, a set of attributes, and a value consisting of character data, and a set of child elements. The interpretation of the information conveyed in an element is derived by evaluating its name, attributes, value and position in the document.

The interface 104 generates and exports to the write-once data store a series of structured data representations (e.g., XML documents) that together comprise the versioned file system. The data representations are stored in the data store. Preferably, the XML representations are encrypted before export to the data store. The transport may be performed using known techniques. In particular, REST (Representational State Transfer) is a lightweight XML-based protocol commonly used for exchanging structured data and type information on the Web. Another such protocol is Simple Object Access Protocol (SOAP). Using REST, SOAP, or some combination thereof, XML-based messages are exchanged over a computer network, normally using HTTP (Hypertext Transfer Protocol) or the like. Transport layer security mechanisms, such as HTTP over TLS (Transport Layer Security), may be used to secure messages between two adjacent nodes. An XML document and/or a given element or object therein is addressable via a Uniform Resource Identifier (URI). Familiarity with these technologies and standards is presumed.

Figure 2:
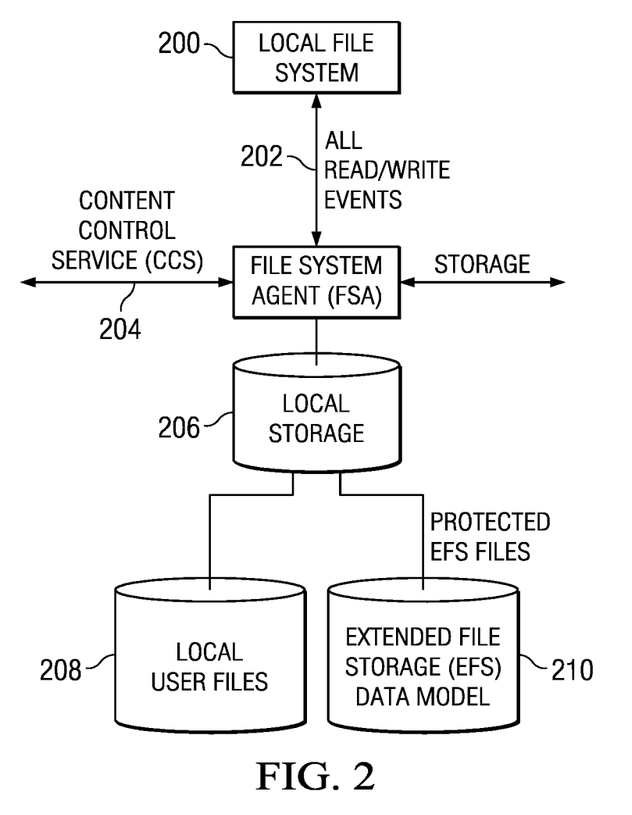
FIG. 2 is a block diagram of a representative implementation of a portion of the interface shown in FIG. 1.

FIG. 2 is a block diagram of a representative implementation of how the interface captures all (or given) read/write events from a local file system 200. In this example implementation, the interface comprises a file system agent 202 that is positioned within a data path between a local file system 200 and its local storage 206. The file system agent 202 has the capability of "seeing" all (or some configurable set of) read/write events output from the local file system. The interface also comprises a content control service (CCS) 204 as will be described in more detail below. The content control service is used to control the behavior of the file system agent. The object-based data store is represented by the arrows directed to "storage" which, as noted above, typically comprises any back-end data store including, without limitation, one or more storage service providers. The local file system stores local user files (the data) in their native form in cache 208. Reference numeral 210 represents that portion of the cache that stores pieces of metadata (the structured data representations, as will be described) that are exported to the back-end data store (e.g., the cloud).

Figure 3:
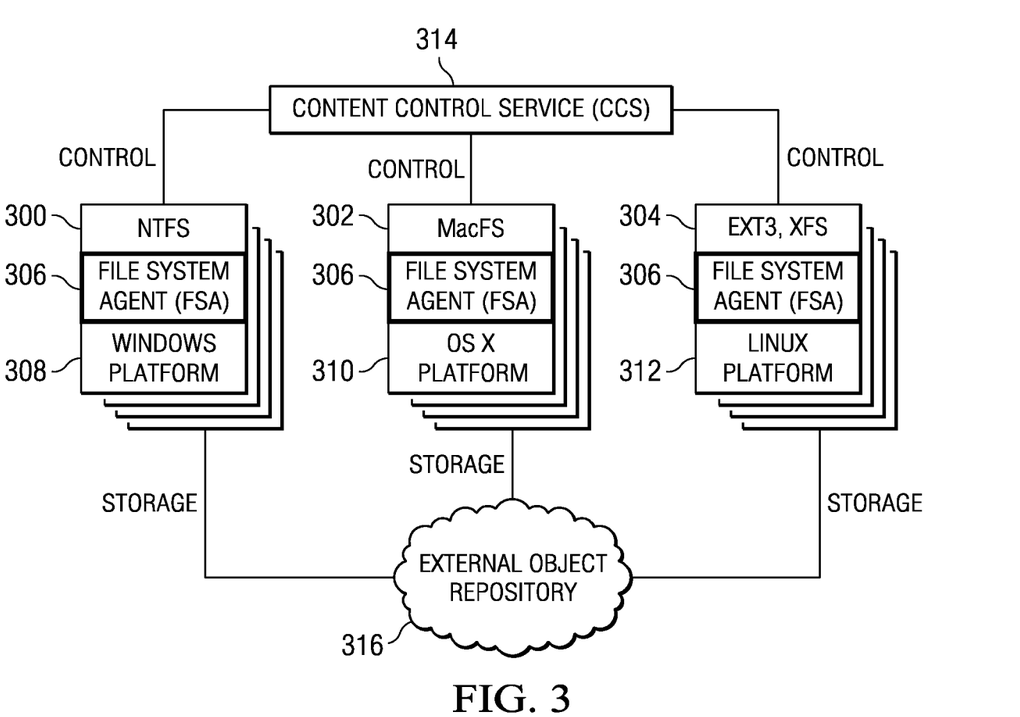
FIG. 3 is a more detailed implementation of the interface where there are a number of local file systems of different types.

FIG. 3 is a block diagram illustrating how the interface may be used with different types of local file system architectures. In particular, FIG. 3 shows the CCS (in this drawing a Web-based portal) controlling three (3) FSA instances. Once again, these examples are merely representative and they should not be taken to limit the invention. In this example, the file system agent 306 is used with three (3) different local file systems: NTFS 300 executing on a Windows operating system platform 308, MacFS (also referred to as "HFS+" (HFSPlus)) 302 executing on an OS X operating system platform 310, and EXT3 or XFS 304 executing on a Linux operating system platform 312. These local file systems may be exported (e.g., via CIFS, AFP, NFS or the like) to create a NAS system based on VFS. Conventional hardware, or a virtual machine approach, may be used in these implementations, although this is not a limitation. As indicated in FIG. 3, each platform may be controlled from a single CCS instance 314, and one or more external storage service providers may be used as an external object repository 316. As noted above, there is no requirement that multiple SSPs be used, or that the data store be provided using an SSP.

Figure 4:
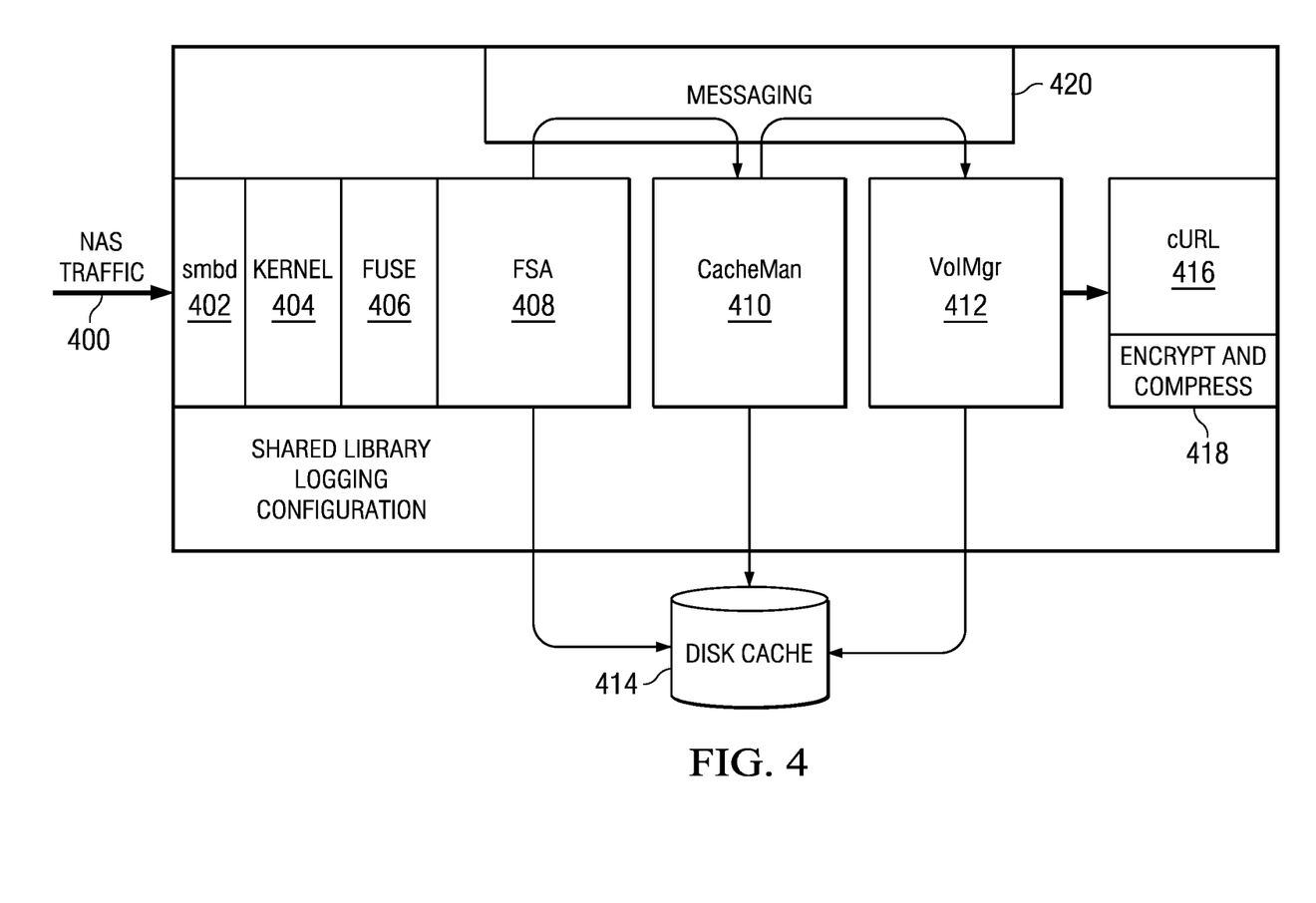
FIG. 4 illustrates the interface implemented as an appliance within a local processing environment.

FIG. 4 illustrates the interface implemented as an appliance within a local processing environment. In this embodiment, the local file system traffic 400 is received over Ethernet and represented by the arrow identified as "NAS traffic." That traffic is provided to smbd layer 402, which is a SAMBA file server daemon that provides CIFS (Windows-based) file sharing services to clients. The layer 402 is managed by the operating system kernel 404 is the usual manner. In this embodiment, the local file system is represented (in this example) by the FUSE kernel module 406 (which is part of the Linux kernel distribution). Components 400, 402 and 404 are not required to be part of the appliance. The file transfer agent 408 of the interface is associated with the FUSE module 406 as shown to intercept the read/write events as described above. The CCS (as described above) is implemented by a pair of modules (which may be a single module), namely, a cache manager 410, and a volume manager 412. Although not shown in detail, preferably there is one file transfer agent instance 408 for each volume of the local file system. The cache manager 410 is responsible for management of "chunks" with respect to a local disk cache 414. This enables the interface described herein to maintain a local cache of the data structures (the structured data representations) that comprise the versioned file system. The volume manager 412 maps the root of the FSA data to the cloud (as will be described below), and it further understands the one or more policies of the cloud storage service providers. The volume manager also provides the application programming interface (API) to these one or more providers and communicates the structured data representations (that comprise the versioned file system) through a transport mechanism 416 such as cURL. cURL is a library and command line tool for transferring files with URL syntax that supports various protocols such as FTP, FTPS, HTTP, HTTPS, SCP, SFTP, TFTP, TELNET, DICT, LDAP, LDAPS and FILE. cURL also supports SSL certificates, HTTP POST, HTTP PUT, FTP uploading, HTTP form based upload, proxies, cookies, user+password authentication, file transfer resume, proxy tunneling, and the like. The structured data representations preferably are encrypted and compressed prior to transport by the transformation module 418. The module 418 may provide one or more other data transformation services, such as duplicate elimination. The encryption, compression, duplicate elimination and the like, or any one of such functions, are optional. A messaging layer 420 (e.g., local socket-based IPC) may be used to pass messages between the file system agent instances, the cache manager and the volume manager. Any other type of message transport may be used as well.

The interface shown in FIG. 4 may be implemented as a standalone system, or as a managed service. In the latter case, the system executes in an end user (local file system) environment. A managed service provider provides the system (and the versioned file system service), preferably on a fee or subscription basis, and the data store (the cloud) typically is provided by one or more third party service providers. The versioned file system may have its own associated object-based data store, but this is not a requirement, as its main operation is to generate and manage the structured data representations that comprise the versioned file system. The cloud preferably is used just to store the structured data representations, preferably in a write-once manner, although the "versioned file system" as described herein may be used with any back-end data store.

As described above, the file system agent 408 is capable of completely recovering from the cloud (or other store) the state of the native file system and providing immediate file system access (once FSA metadata is recovered). The FSA can also recover to any point-in-time for the whole file system, a directory and all its contents, a single file, or a piece of a file. These and other advantages are provided by the "versioned file system" of this disclosure, as it now described in more detail below.

For more details concerning the filer as described above, the disclosure of U.S. Pat. No. 9,575,841 is hereby incorporated by reference.

Global Lock

The above-described approach has been extended to provide multiple-site/multiple-filer access to the same NAS namespace. In this model, the cloud is the center for all storage and operations, and the filer is at the edge at customer sites providing access to the data. Typically, none of the appliances/devices communicate with each other directly. Rather, communication is through the highly scalable, fault-tolerant cloud, and over standard Internet connections (with no special requirements). This hub-and-spoke model allows for wide distribution of data throughout the world with many devices concurrently accessing the data, and without reliance on any specific sites or connections for the stability of the entire system. It provides high-performance access, data distribution and sharing throughout many industry verticals.

Although each local filer offers standard NAS protocol locking for local users collaborating on files and documents, those locks typically are not extended to other sites/locations. Rather, a strong conflict management model is implemented that guarantees no data loss in the event of a conflict and that gives strong indications via logging and asset naming indicating what conflicted and when.

As the adoption of this type of global file system has grown, so has the demand for the ability to collaborate on a portion of the documents across multiple filers/sites. Collaboration requires the local protocol locks to be extended through the system, providing global lock functionality. A versioned file system with global lock is described in U.S. Publication No. 2016/0154817, assigned to Nasuni Corporation, the disclosure of which is incorporated by reference. This approach provides for the ability to collaborate on a portion of the documents across multiple filers/sites. Such collaboration requires the local protocol locks to be extended through the system, providing global lock functionality. Locks can prevent clashes or corruption when multiple users attempt to write to the same file concurrently. In this context, the word "global" is not intended to be limiting.

In the global lock approach, preferably lock management is centralized even though the file systems do not communicate with each other. The lock functionality operates at a very high speed, and at large scale (e.g., millions or billions of files). Also, data can move through the system faster than traditional snapshot/synchronization process flow.

Global locking is achieved with several extensions to the versioned file system approach described above, namely: extending locks to the service, providing a centralized lock manager in the cloud, allowing for individual file snapshot, synchronization, merge cycles to ensure that current data is always available upon lock grant, configuration of locks preferably at a folder-level granularity, and/or the ability of administrators to break locks when appropriate.

One way to achieve global locking is to extend local locks to a centralized global lock manager in the cloud. This can be done by intercepting local lock requests and transforming those requests into a common lock protocol that can be centrally managed in a global lock server. Local file lock requests are generated by a local computer and sent to a server when opening a shared file. The local file lock request can vary in form depending on the network protocol used by the operating system on the local computer, for example to communicate with a network-attached file system (i.e., NAS). For example, the network protocols Server Message Block (SMB) or Common Internet File System (CIFS) generate file lock requests using a first protocol. Similarly, the network protocol Network File System (NFS) generates file lock requests using a second protocol. These protocols are generally incompatible and need to be interpreted differently. One skilled in the art will recognize that alternatives to SMB, CIFS, and NFS can be used, and such alternatives are within the scope of this disclosure. For example, the Web Distributed Authoring and Versioning (WebDAV) protocol can be used to communicate with the NAS. Additional protocols include Delta-V and Apple Filing Protocol (AFP), though this list is not exhaustive.

Figure 5:
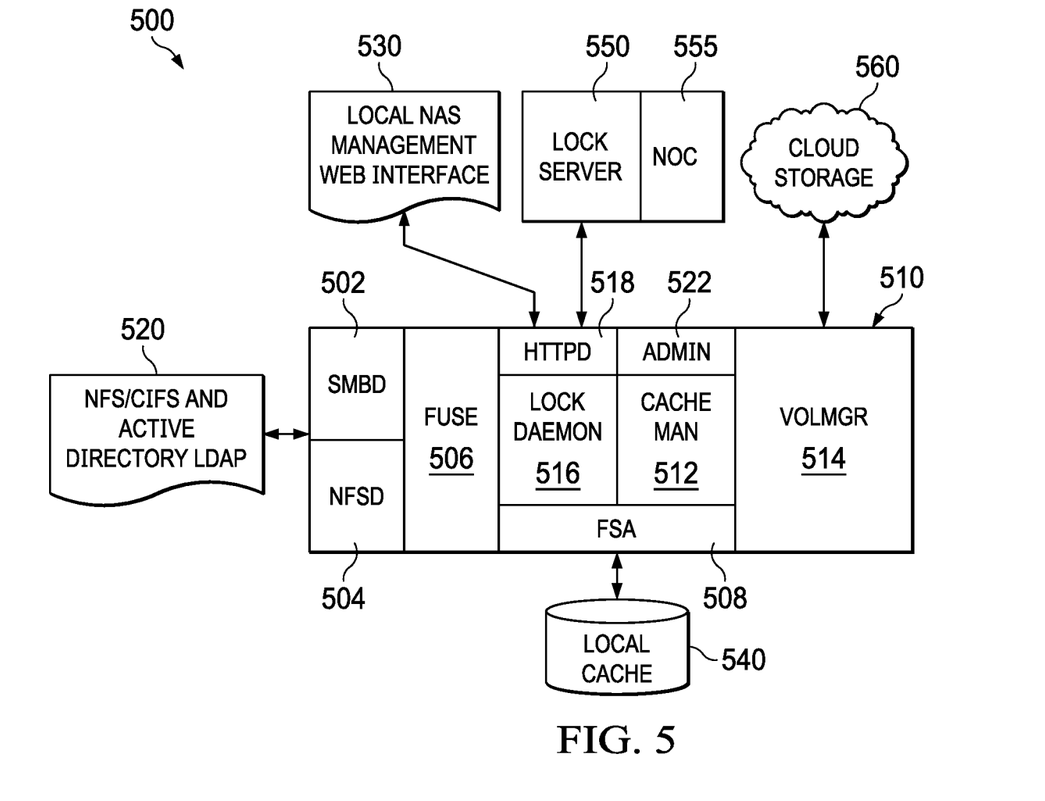
FIG. 5 depicts a versioned file system that implements global locking.

FIG. 5 is a block diagram that illustrates a system 500 for managing a versioned file system that includes the capability of global locking. The system 500 includes an interface 510 in communication with local traffic 520, a web-based portal 530, a local cache 540, a lock server 550, and cloud storage 560. The interface 510 includes a SMBD layer 502, a NFSD layer 504, a FUSE module 506, a FSA 508, a cache manager 512, a volume manager 514, a lock daemon 516, a transport layer 518, and an administrative module 522. In some embodiments, the interface 510 is the same as the interface described with respect to FIG. 4 but with the addition of the lock daemon 516.

SMB/CIFS lock requests are intercepted by SMBD layer 502, which is a SAMBA file server daemon. An optional Virtual File System (VFS) module can extend the SAMBA server daemon to send the local lock information to the FSA 508. FSA 508 then communicates with FUSE 506 to coordinate the FUSE file descriptors (pointers) with the ioctl information to determine a path for the given file(s) associated with the lock request. Assuming a path is enabled for global locking, FSA 508 sends the lock and path to the lock daemon 516, which handles the lock request as described below. If a path is not enabled for global locking, the lock request stays within the SAMBA server as it did previously (e.g., conflict management, etc. as described above) and it is not sent to the lock daemon 516.

NFS lock requests are passed through the NFSD layer 504 to FUSE 506. Assuming a path prefix is enabled for global locking, FSA 508 communicates with the lock daemon 516 to handle the lock request using a common protocol, as described above. If the path prefix is not enabled for global locking, FSA 508 handles the lock request as it did previously (e.g., conflict management, etc. as described above) and the lock request is not sent to the lock daemon 516.

The lock daemon 516 is responsible for local lock management and coordinating with the global lock server. The lock daemon 516 can perform one or more of the following functions: (a) translating the lock format; (b) communicating with the centralized lock server; (c) acquiring locks; (d) lock peeking; (e) lock re-acquiring; (f) lock releasing; and (g) communicating with the filer.

With respect to translating the lock format, the lock daemon 516 can translate the local file lock requests to a common lock format understood by the centralized lock server 550 (described below). Using this approach, the lock server 550 receives a lock request in one format regardless of the underlying network protocol (e.g., SMB/CIFS or NFS). The centralized lock server 550 can be in a network operations center (NOC) 555.

The lock daemon 516 can then communicate with the centralized lock server 550 by making calls to a Centralized Lock API. Through the API, the lock daemon 516 can execute a lock request, an unlock request, and/or a lock break request. A lock request generally requires the transmission of certain information such as the first handle (a unique identifier to the original base object for the file), the requested lock mode, the file path, the protocol of the requester, etc. Additional information such as timestamps and serial number can be included in the lock request. The requested lock mode is the type of access for the lock, such as a shared or exclusive lock, a lock for read, a lock for write, lock for exclusive write, lock for shared write. If the centralized lock server 550 grants the lock request, the lock server 550 then uses information provided in the lock request (e.g., the first handle) to retrieve the latest version of the requested file from cloud storage 560. The centralized lock server 550 transmits the latest version of the requested file to the lock daemon 516, which can store the file in local cache 540.

An unlock request can include the same or similar information as the lock request but with an updated handle name that was generated as a result of modifications to the locked file. A lock break request can be provided by a system administrator to manually unlock a file (e.g., if a user leaves a locked file open overnight, a server goes down, etc.).

Prior to making a new lock request, the lock daemon 516 determines whether a lock already exists in local cache 540 or on the centralized lock server 550. If no lock exists in either of those locations, the lock daemon 516 acquires a new lock through the centralized lock server 550. The new lock can have a lock mode computed using the requested access and share profiles (masks).

Lock peeking can be initiated every time a file is opened for read. In lock peeking, the lock daemon 516 can query whether a lock exists on the file prior to opening the file. If a lock exists, the lock daemon 516 can also determine the associated lock mode to evaluate whether the lock mode permits the user to open the file. The lock daemon 516 retrieves this information from local lock cache 540 if the filer requesting the lock peek already has a write lock on the file. Otherwise, the lock daemon 516 retrieves this information from the centralized lock server 550. Each lock peek request can be cached in the local lock cache 540 for a short time period (e.g., several seconds) to reduce traffic to the central lock server 550 if the lock daemon 516 receives a new lock peek request shortly after the first lock peek request.

For example, another user may have a lock for exclusive write access to the file that does not allow any shared access (i.e., no shared read access). In this example, the lock daemon 516 determines from the lock query that the file cannot be opened due to an existing lock on the file. In another example, the lock mode can allow shared read or write access in which case the lock daemon 516 determines from the lock query that the file can be opened.

During lock peeking, the lock daemon 516 can also retrieve additional information about the file, such as the file handle, handle version, first handle, and lock push version. The file handle is a pointer to the latest version of the file in the cloud. The handle version is a version of the file in the cloud. The first handle provides a unique identifier to the file across versions and renames of the file. The lock push version is the latest version of the file that was sent to the cloud.

The lock deamon 516 can cache locks and unlocks in a local lock cache 540 for release to the centralized lock server 550. If a lock request is made for a file that has a cached unlock request, the lock can be reestablished without having to acquire a new lock from the centralized lock server 550. In such a situation, the unlock request is cancelled. This caching can reduce load on the lock server 550 and improve response time. In general, the unlock requests are cached for a certain period of time prior to release to the lock server 550 to allow for such lock reestablishment.

In some embodiments, the lock in cache can be fully reset with a new lock mode calculated from the requested access and share masks in a new lock request. If there are outstanding locks, the new lock request could result in a partial lock reset to a new mode. The new mode in the partial lock reset can be calculated from an access mask that is inclusive of the existing and new access masks and from a share mask that is the least common denominator between the existing and new share masks. Such a partial lock reset can occur if the new lock mode is different from the existing lock mode, for example if the existing lock mode is shared while the new lock request is for an exclusive lock.

A new lock request can cause a lock downgrade or upgrade depending on the existing and new lock modes. For example, a lock downgrade can occur if the lock request has an access mask less than or equally permissive than its current access mask and its shared mask is less than or equally restrictive than its current share mask. The lock daemon 516 can cache downgrade requests since applications commonly upgrade or downgrade lock modes on files in rapid succession. In addition, a lock can be downgraded when it is cached for release. Instead of releasing the lock in local cache 540 the lock is reacquired with the new mode (access mask or shared mask). Before the lock is downgraded, the current data can be sent to the cloud so that it's available for the next locker. A lock can also be downgraded when it is not in cache for release. This can occur when an unlock doesn't completely reset the lock mode (e.g., a shared mode lock is unlocked but another lock still exists on the file). In this case, the lock is downgraded with the outstanding mode still on the lock. It also helps keep unlocks completely asynchronous by allowing lock caching.

A lock upgrade can occur for locks that do not meet the lock downgrade conditions described above.

As discussed above, the lock request includes information on the protocol (e.g., SMB/CIFS or NFS) of the requester and the lock mode. The lock server 550 receives this information and can determine, based on any existing lock(s) on the requested file, whether the lock server 550 can issue multiple locks on the same file. The lock server 550 can evaluate the protocol used by the requester of the existing lock and the associated access/share permissions of that lock and determine whether protocol used with the new lock requester is compatible.

In addition, the lock daemon 516 handles lock releases. In some embodiments, the lock daemon 516 does not immediately send the lock release to the lock server 550. This time delay can reduce load on the centralized lock server 550 because files are frequently locked and unlocked in rapid succession, as discussed above. Before a lock is released, if the file was changed, the current data is sent to cloud storage 560 (e.g., Amazon S3, Microsoft Azure, or other public or private clouds) so the most recent data is available to the next locker.

Finally, the lock daemon 516 can communicate with the FSA 508. The lock daemon 516 can receive lock requests and/or lock peek requests from FSA 508, which the lock daemon 516 translates into a common protocol for transmission to the centralized lock server 550, as discussed above. The lock daemon can also pass the updated handle name to the FSA 508 to perform a file-level snapshot before unlocking a file and/or a file level merge/synchronization before locking a file.

For global locking to be successful, it is desirable for the locker to have the most recent version of the file associated with the lock request (and lock grant). To accomplish this, the cache manager 512 can be configured to snapshot a single file (e.g., the file associated with the lock request) without triggering a copy-on-write (COW) event (which would cause a version update, as discussed above) and without affecting other snapshot operations. After a single file snapshot, the cache manager 512 can mark all parent directories of the file as changed or "dirty." In addition, the fault manager algorithm can be configured to fault a single file based on requests from the FSA 508.

The merge/push algorithm can be modified to provide for merging single files. Before the locked file is pushed to the local cache 540, the NOC 555 assigns a unique lock version (e.g., 64 bit) to the file. The lock version can be used by FSA 508 to determine whether a locked file or its metadata is dirty (i.e., changed). The parent directories of the locked file can continue to use the existing write version assigned from the last TOC. Thus, FSA 508 can track two values: lock_write_version and lock_push_version. When a file or directory is dirtied, the lock_write_version is updated. When a file or directory is pushed to local cache 540, the lock_push_version is updated.

As discussed above, the file data from the NOC 555 (or centralized lock server 550) is merged into the local cache 540 before the FSA 508 returns control of the file to the client. To determine if the file data in the NOC 555 is newer than the file data in the cache 540 (e.g., if the lock is retrieved while an unlock request is cached), the FSA checks MAX (lock_write_version, lock_push_version) against the NOC lock version. If the NOC lock version is greater than the lock_write_version and the lock_push_version, the file data (object metadata and data) from the NOC 555 is used to instantiate the object (locked file) in the local cache 540. If the file data in the cache 540 is newer, then the file data from the NOC 555 is discarded. In the circumstance where the NOC 555 indicates that the file is deleted, the delete version is compared to the local cache 540 version in order to apply the delete to the local cache 540.

In addition, the merge/push algorithm can be modified to reconcile the single-file merges of locked files with the snapshot merges of files. Any file that was "fastsynched" through the FSA 508 (i.e., locked) or "fastpushed" to the cloud (i.e., unlocked) is designated as "cloud fastsynced." When merging an object or file that is considered "cloud dirty" or "cloud fastsynced," the FSA 508 will update the file if the incoming lock_push_version is greater than MAX (lock_write_version, lock_push_version), as discussed above. If the incoming lock_push_version is less than MAX (lock_write_version, lock_push_version), the cache object is considered newer and the incoming update is discarded by the FSA 508. Also, when a file is missing (deleted) from the pushed version but the file is also locally fastsynched, the file will not be deleted. This merging can occur concurrently or before the global lock on the file is granted.

In addition, if a file has been deleted or renamed, the local cache metadata can record a "delete tombstone" which includes certain information (e.g., parent first handle, lock version, name, etc.). FSA 508 merges a file as new if the file is newer than any delete tombstone contained in the cache for the unique file. This can address the situation in which a file has been fast synchronized before merge. In that case, the incoming cloud dirty file is old compared to the cache and the import is discarded.

To ensure that the unlocked file includes the changes from the latest version, the locked file can only be unlocked when the lock_push_version is greater than or equal to the lock_write_version at which point the FSA 508 sends the lock_push_version back to the NOC 555 (or centralized lock server 550) to store the new version of the file in cloud storage 560.

In some embodiments, the interface 510 snapshots and merges new files at the time of creation. The new file requests can be stored on the lock server 550 with the lock entries. Other users can poll the lock server 550 to determine if new files/objects exist that have not yet been populated to the cloud 560, for example if there are new files/objects in a given directory. After the new files have been created, the locker server 550 can merge the new file requests into the appropriate directories in the cloud 560.

Sharing

The following provides further details regarding "sharing" in the context of a multi-site implementation. This technique is described in U.S. Pat. No. 8,661,063, the disclosure of which is hereby also incorporated by reference. As used herein, "sharing" refers to the ability to provide full read/write access at any time to any file/folder/volume owned by a particular filer, or across multiple such filers. According to this approach, independent volumes are enabled to share data in the cloud.

Consider the case of two (2) filers that desire to do full read/write sharing of a single volume, where each of the filers uses an interface and creates a VFS as has been described above. In particular, Filer A has Volume-RW, and Filer B has Volume'-RW. Users of Filer A read and write Volume-RW as a normal file system, and users of Filer B read and write Volume'-RW as a normal file system. This type of operation has been described above. Now, according to the "sharing" technique herein, filers first register into a sharing group. Preferably, a web-based interface (or the like) is provided for this purpose, although any other convenient sharing group registration mechanism may be used. The registration interface includes or is associated with appropriate authentication and/or authorization mechanisms to ensure privacy and security, and that entities desiring to "share" independent volumes can manage their sharing appropriately. (Filers may also de-register from a sharing group using the web-based interface). At a start of each snapshot, a filer that has registered for a sharing group is provided (e.g., by the service provider or otherwise) a "snapshot lock" that includes its version number. By definition, during this lock no other filers can snapshot. Once the version is acquired, the filer that acquires the lock does the following: (i) the filer first looks at delta lists (attached to TOCs, and as described in more detail below) from the last version this filer pushed to the current version, and then applies all changes to its current file system; (ii) the filer then begins pushing to the cloud; and (iii) completes the push. In the alternative, instead of using delta lists, the filer can compare file system metadata (directories, structures, and so forth). When using file system compare, portions of the directory tree may not need to be compared, e.g., if there are common elements between or among the sides being merged.

During the push (i.e. as all chunks and the file manifests, etc. are being pushed), optionally a notification is sent to all other members of the sharing group notifying them of new/changed files. In the embodiment where notification is used, the message typically includes only the cloud handle for the file manifest; other information (e.g., the GUID of the filer that wrote the file, the path of the file in the namespace, etc.) can be learned from this manifest. Preferably, the sending filer only has to send once, and the notification message is replicated into a persistent message queue for each other filer in the sharing group. (Preferably, each filer in the sharing group has an associated message queue, although this is not a limitation).

Once notified, each other filer in the sharing group performs the following: if the version of the object is greater than its own version, the other filer inserts the new/changed file into its "now" current file system, e.g., using a fast restore algorithm. If the version of the object is less than its own version, the other filer ignores the update.

During the snapshot, the filer doing the snapshot gets bundles (associated with each TOC) from the cloud for each version between its last snapshot and the current snapshot and that contains metadata about the items changed during the snapshot. Such metadata (sometimes referred to as a delta list) may include: path names, access control lists (ACLs), and handles. A delta list may be attached to each TOC that indicates what changes since the last TOC. Preferably, the deltas (differences) between the versions are merged into the current snapshot sequentially. A new delta frame is created and tied into the new TOC in connection with completing the snapshot operation.

As an optimization, changes may be streamed to the cloud when snapshotting is not occurring to improve sharing response time.

With respect to repeat changes, preferably a special message is sent to all others in the sharing group to confirm that the original manifest is no longer referenced (i.e. essentially that all in the sharing group have processed the queue to the point of the new message).

Sharing Mechanism—Implementation

1. Reduced Lock Sharing

As described, a simple technique to share a consistent fully-versioned file system (and, in particular, a "volume" therein) between or among multiple nodes (i.e., the filers in a sharing group) is to use a single distributed lock (the snapshot lock, as described) to protect each version of the file system. Preferably, this lock is then managed with one or more fairness algorithms to allow each node (filer) access to the shared file system volume to create its new version. While this approach works well, because each filer can only do work when under the lock, the one or more other filers (that do not have the lock) are essentially idle until they receive it. Accordingly, the aggregate bandwidth utilized by those in the sharing group may not be optimized.

Thus, a variant of the described approach is to reduce the period during which nodes in the sharing group operate under lock. This is sometimes referred to as "reduced lock sharing." Under this variant, and because data does not have to be sent to the cloud under lock, the lock is moved (i.e., delayed) so that it is not initiated until the metadata update phase. This allows for increased aggregate bandwidth to the cloud from all the nodes and faster responsiveness of the nodes in that the lock only occurs when the work (of sending the data to the cloud) is done and it is time to update the file system.

2. Non-Preemptive Sharing Scheduling

While reduced lock sharing is advantageous, one further issue that it does not address is responsiveness and visibility of new files to other nodes (other filers). Even if multiple nodes can send their data to the cloud concurrently (which reduced lock sharing permits), if the metadata (which is what enables the data to be visible to other filers) is only sent when all of the data is finished, then other filers may not see the data appear for an unacceptable time period. This can be addressed by another variant, which is referred to herein as "non-preemptive sharing scheduling." According to this further optimization, a data push to the cloud is broken up into two or more separate pushes. Each push then comprises a first phase, during which the data is sent to the cloud (but not under lock, as per the reduced lock sharing concept), followed by the metadata update (which occurs under lock) to tie the new files into the shared filesystem. In non-preemptive sharing, preferably a time limit is associated with the first phase to limit the objects pushed during the first phase.

An issue that may arise when non-preemptive sharing scheduling is implemented is that, because not all files are pushed, it is possible to be in an inconsistent filesystem state. For example, take a directory that contains two files, one of which was pushed, and one which was not. Pushing one file in that directory necessitates pushing that directory for the file to be visible to other filers, but at the same time, the directory must not be pushed unless all files it contains are safely in the cloud. Because of this conflict, the directory is in an inconsistent state. While it is permissible to push a directory with a mix of modified (but pushed to the cloud) and not modified files, it is not safe to push a directory containing files that were modified but not pushed to the cloud. Thus, to maintain consistent versioned filesystem semantics, limiting the objects pushed in the first phase also requires matching changes in what objects are pushed in the second phase.

Without limitation, the list of data objects for pushing from a particular node in the first phase can be chosen via any means desired (large files first, oldest files first, a mix, or the like), but optimally the chosen data objects are in as few directories as possible. Because all files in a given directory need to be pushed, this constraint simplifies the second phase metadata object choice later. Preferably, the first phase works against this list until the time limit is reached, after which the sending node stops sending new files and only permits files already started to complete. This ensures that, when this phase completes, while there are a number of files in the cloud that are not yet referenced by metadata (and perhaps a number of files that were not sent at all), there are no files that are split between the two states.

The time for the first phase to push is chosen to balance responsiveness and cost. The lower the number, the more responsive the system will be (that is, new data will be available to other filers sooner). The higher the number, the lower the cost and load will be (as there is a network, storage, and processing cost for all work done when pushing data).

Before the second phase starts, preferably there is a brief clean up phase (an intermediate phase between the first phase and the second phase) during which some extra data files may be pushed to the cloud to ensure that the filesystem is in a consistent state, so that the second phase can push up the metadata. For example, if a given directory had two dirty files in it, and the first phase had only pushed one, that would be an inconsistent filesystem, so the intermediate phase will push the other file in that directory to make that directory ready for the second phase. The intermediate and second phases preferably are done together and under the same lock. The intermediate phase may be thought of as a part of second phase. When the second phase proper begins, the list of metadata objects for pushing are chosen to be the minimal set of metadata that encompasses the objects pushed in the first phase and the intermediate phase, combined with any metadata that has changed alone without a corresponding data change.

3. Merge/Push to Obtain Consistent Local View Prior to Obtaining Lock

Before a filer (a node) can begin to send data to the cloud (using the reduced lock sharing and/or non-preemptive sharing scheduling techniques described above), it is first necessary that the node have a consistent view of the volume into which the data is to be sent. In particular, each member of the sharing group must have the same view of the volume for sharing to be efficient and useful. To this end, a merge/push functionality is implemented at each node that is participating in the sharing group. That functionality is now described.

Thus, to share a fully-versioned file system between multiple nodes in a read-write fashion, asynchronous updates at each of the nodes is permitted, and each node is then allowed to "push" its individual changes to the cloud to form the next version of the file system. To present reasonably consistent semantics, before pushing its changes to create the next version, each node in the sharing group is required to merge the changes from all previous versions in the cloud that were created since the node's last push.

A push/merge cycle to generate a consistent local view of a volume (that is being shared in the cloud) is now described, by way of example. As described above, in a system of N nodes sharing read-write access to a single versioned cloud file system (i.e., a particular volume therein), changes to the file system are written locally to the cache at a node X. As also previously described, the nodes in the sharing group push their un-protected changes to the cloud, taking turns in doing so using the lock mechanism. Preferably, each push from a node X is staged from a point-in-time snapshot so that it is internally consistent. Each such push forms a new version of the versioned file system in the cloud. The changes pushed from node X are not visible at node X+1 (of the sharing group) until node X+1 sees the new version in the cloud and merges the changes from that version into its local cache. To be sure that changes from different nodes do not diverge, each node X is required to merge changes from all other nodes before pushing its changes to the cloud.

Permission to push changes to the cloud is granted by the acquisition of the lock as has been described. The lock can be implemented in a variety of ways. For an individual node, the sequence of steps in the cycle may be as follows. At step 1, the lock is obtained from the cloud (the service provider). The lock indicates what the version number of the next push should be, e.g., X. Then, at step 2, and for each version in cloud Y between a current version and version X, the changes of Y are merged into the local cache, and the current version is marked as Y+1. At step 3, a local snapshot of the cache is created, and the current version is marked X+1. The, at step 4, all local dirty changes are then pushed from the local snapshot to the cloud as version X+1. The lock is then released at step 5 to complete the push/merge cycle.

To merge the changes from a cloud version X, the local filer must have merged all versions up to and including X−1. To merge a single directory from the cloud into the corresponding cache directory the following process is used:

1. First find all elements of the cloud directory that have a shared history with an element in the cache directory. As used herein, a "shared history" means that the two objects are derived from the same original object. Each element in the cloud can only share history with a single element in the cache.

2. For each object from the cloud that shares history with a cache element, if the cloud element is "cloud-dirty" then the object should be merged in. As used herein, a cloud element is "cloud-dirty" for a version X if either its data or metadata is newly written in version X.

3. To merge an element into the cache, the routine processes cache objects depending if they are "clean" or "dirty." If a cloud object is clean, it is overwritten with the cloud object. For stub objects, overwrite simply means that the handle and metadata can be overwritten. For non-stub files, handle and metadata should be overwritten and the file data in the cache should be made into a stub. For non-stub directories, the handle and metadata should be overwritten and the contents of the cloud directory should be (recursively) merged with the cache directory. If the cache object is dirty (a name change is necessary to make metadata dirty), the conflicts may be resolved as follows. For data/data conflicts (files), the cloud object comes in labeled as a conflicting copy of the file. For data/data conflicts (directories), the cloud directory contents are (recursively) merged with cache directory. For metadata/metadata conflicts, discard the cloud metadata change and keep the local metadata change. For metadata/data conflicts, overwrite the cache metadata with the new cloud metadata but keep the cache data. For data/metadata conflicts, overwrite the handle in the cache with the cloud handle, but keep the cache metadata (for files, the cache data should be stubbed; for directories, the cloud directory should be (recursively) merged with the cache directory).

4. Next, import all elements from the cloud directory that have no shared history with the cache elements. When importing, if the cache has an object with the same name if it is clean, it can be deleted before proceeding to import. When importing, if the cache has an object with the same name if it is dirty, import the cloud object under a "conflict" name.

5. Finally, delete all elements from the cache that did not have a shared history with an element in the cloud directory (unless the element is dirty). This completes the merge process.

To merge a whole tree, the above-described merge process is carried out on the root directory of the version to be merged. This may create additional directories to be merged. Directories are continued to be merged until there are no more directories remaining to be merged.

4. Auto-Fault

To facilitate usability, it is advantageous to populate the cache of the local node with changes that are being made to the versions in the cloud. In an example scenario, multiple users add data to their shares from multiple locations. When a remote office (part of the sharing group) wants to access the data, it may be necessary to fault the data from the cloud. This can be a time-consuming process that utilizes significant resources. To ameliorate this issue, an auto-fault algorithm may be implemented at the local node to pull data proactively (as a background process). The algorithm determines when new data is added to a volume (that is the subject of the sharing group) and begins faulting it in the background proactively. Therefore, when the user at the remote office attempts to access the data preferably it is already faulted into their local cache.

Preferably, the algorithm is triggered when merging a shared filesystem (in particular, a volume that is being shared). As the filesystem volume is compared for deletions, additions, or conflicts, the newly-replicated data is scheduled for so-called "auto-fault." The filesystem sends the data to be auto-faulted to an auto-fault manager, which then queues the fault. Preferably, the auto-fault function runs throttled in the background, and auto-fault requests are scheduled behind user requests. Auto-fault also allows data to be pushed to the cloud so snapshots can make progress and data replication can proceed un-interrupted. If an auto-fault is scheduled and the data is requested by the user, the auto-fault request is re-scheduled and the user request is serviced without delay. All prefetch associated with the auto-fault request will also be treated as a user request.

Preferably, auto-fault is called as part of the merge process, and it helps to provide better responsiveness of shared data, especially in the case of thinly-provisioned distributed system.

The above-described techniques provide significant advantages, the foremost being the ability to share independent volumes that are established by distinct filers. This conserves storage space in the cloud, does not require the use of shadow volumes, does not require snapshots to alternate between or among filers, facilitates near-live sharing of files even before a snapshot is complete, maintains synchronous snapshot of file system capability, and enables multiple volumes to have independent histories without twice the data being persisted in the cloud.

The filers may be anywhere geographically, and no network connectivity between or among the filers is required (provided filers have a connection to the service).

Sharing enables multi-site access to a single shared volume. The data in the volume is 100% available, accessible, secure and immutable. The approach has infinite scalability and eliminates local capacity constraints. The sites (nodes) may comprise a single enterprise environment (such as geographically-distributed offices of a single enterprise division or department), but this is not a requirement, as filers are not required to comprise an integrated enterprise, though practical limitations (e.g., security) can dictate whether multiple enterprises can share access to a common file system. This enables partners to share the file system (and thus particular volumes therein) in the cloud. Using the service provider-supplied interfaces, which are preferably web-based, the permitted users may set up a sharing group and manage it. Using the sharing approach as described, each member of the sharing group in effect "sees" the same volume. Thus, any point-in-time recovery of the shared volume is provided, and full read/write access is enabled from each node in the sharing group.

Selective Push Classes and Notifications

In the approach as described above, and as noted, a collection of one or more files (e.g., a directory, a set of files, a single file, etc.) may be organized into a system- or user-defined group (a so-called "push class") and propagated from a source filer to one or many target filers that share the same volume (in the multi-site embodiment as described above). A push class (e.g., the "contents of /a," "all *.jpg files on volume V," "all files written in the past hour," etc.) provides a convenient mechanism for associating together a collection of one or more files, and to manage multi-site collaboration with respect thereto. Typically, a particular set of files is associated with a push class (or "push") version number, as a well as write version number. Thus, e.g., when directory /a is first written, these values are {push version 1, write version 1}. After a file such as "foo.txt" is written to this directory, these values are then {push version 1, write version 2}, and so on. As files are written to the local filer, the data is propagated to the cloud object store in the manner previously described. In a push operation, and as noted above in the sharing description, the filer pushes file data and metadata in distinct phases; thus, for example, in a first phase (e.g., up to a given time t) the filer pushes files; after time t or if the filer otherwise obtains notification that the first phase of the push has completed, it pushes the metadata necessary to make the files visible to all filers (in the multi-site configuration) that are sharing the volume. Preferably, the filer also is configurable to define distinct criteria for the first phase push operation. The ability to configure the criteria for the push operation for a particular push class provides a "selective push" function. Once the filer initiates a selective push, a determination needs to be made when the push has arrived to the one or more other filers that are sharing the volume. This "view" of what the other filers are "seeing" is necessary to facilitate multi-site collaboration, as users associated with multiple filers may write to a file (within a push class) concurrently. Thus, a particular filer needs to be able to query its local database to determine the write version associated with a push class, as well as to initiate a query (typically from a centralized management entity) to other sites (filers) to determine the value of the write version of that push class (on those other filers).

The technique of this disclosure provides a notification mechanism by which a local filer (the "source filer") determines the status of a push class with respect to other filers (the "target filers") in a multi-site implementation. The approach herein assumes that one or more push classes are configured, and that a particular push class has associated therewith a push version number (or "identifier"). In a first embodiment, and after file(s) associated with a push class are written locally, a multi-phase push operation is carried out. In the first phase, a selective push as has been described is initiated. As noted, a selective push typically involves defining and enforcing one or more criteria associated with the push class. Once the selected push is initiated on the local filer, the local filer needs to know when that push has arrived at the other filer(s) that are sharing the volume. To this end, once the second phase (the metadata) push is initiated, the filer generates a payload identifier for the selected push class. In particular, until that point, the filer cannot know the version in which the new data being written ends up in the cloud (because in a multi-site embodiment other filer(s) may be writing the same file at the same time); once a phase two metadata push starts, however, the version number is fixed, and once the metadata push completes the contents of the version are known.

In this embodiment, and after at least the metadata push starts, a management entity (on behalf of the local filer) queries the one or more other filer(s) to determine their respective payload identifier for the push class. When on behalf of the local filer the management entity determines (by querying or otherwise) that the payload identifier (in effect the push class version number) at the other filer(s) is greater than its number for the push class, then the local filer (informed by the management entity) knows that the other filers already have the current write data for the files in that push class; conversely, when the management entity determines that the push version number at the other filer(s) is less than its push version number and informs the local filer, then the local filer knows that the other filers do not have the write data. The exchange of payload identifiers (through a simple query and response protocol, typically via the management entity) among the filers sharing the volume thus provides the local filer with the necessary information to determine if and when the other filer(s) share a consistent view of the push class.

While the above approach works well, a preferred approach is now described. In this variant, and in lieu of generating and passing payload identifiers for the selective push classes, the filer operates as follows. The filer first writes the files that are being shared. The push for the push class associated with the files is then performed and allowed to complete. Via the management entity (acting as an intermediary), the local filer then queries for the push version of the metadata for the push class in question. Because of dirty-to-root semantics, this operation essentially is tantamount to "query the push version of the root." On the remote filer, a query for the push version of the volume root is made. Because of the dirty-to-root semantics, once the volume root is at or above the push version, the new data is available at the remote filer. The remote filer then responds to the local filer query with a notification to this effect.

If alternative dirty-to-root semantics are implemented, this alternative approach can still be implemented by just checking the most local root (e.g., a parent directory) for its push version.

A management console, which may be web-based, may be used to associate together a collection of one or more files in a push class, and to associate one or more criteria to the push class to define a selective push class. Alternatively, push classes may be defined by the system—or otherwise available, e.g., as templates.

Figure 6:
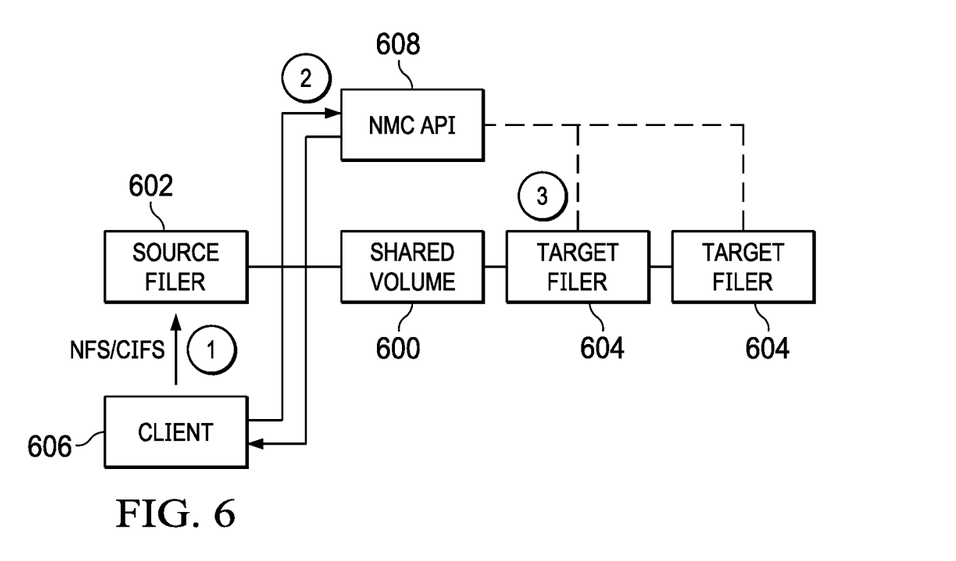
FIG. 6 depicts a top level architecture for the push class function of this disclosure.

The following provides additional technical details regarding a preferred implementation of a push class architecture according to this disclosure. As noted above, preferably the function described (i.e., pushing the specified class) only occurs during a snapshot of the volume. As shown in FIG. 6, a volume 600 supported in the cloud storage is being shared by a source filer 602, and a set of one or more target filers 604. A client 606 writes the file in the usual manner, e.g., via NFS/CIFS. The push class functionality is embodied here in a management console-based application programming interface 608 (depicted as the Management Console (NMC) API). In operation, at step (1), the client 606 writes the Directory Structure (CLASS) to the source filer 602. At step (2), the client 606 executes a PUSH_SNAPSHOT_CLASS function call to the management API 608. At step (3), the management API then responds by issuing an IS_SNAPSHOT_CLASS_PRESENT function call to each of the target filers to determine the status of the push with respect to the target filers. These API calls are described in additional detail below.

PUSH_SNAPSHOT_CLASS (source_Filer_ID, volume_ID, push_class, time_out)

The source_Filer_ID is the name of the filer where the snapshot begins. The volume_ID is the shared volume (FIG. 6, 600) that all the filers must share to perform the consistent push. The push_class is an optional parameter that defines the file set that will be included in the snapshot (e.g., a fully-qualified directory path for volume_ID). If no class is specified, it means that all dirty files must be pushed in this snapshot. The time_out is another optional parameter that caps the amount of time that the system will spend on this particular snapshot. The PUSH_SNAPSHOT_CLASS function call returns a snapshot_ID only if the snapshot has completed (i.e., has not exceeded the time_out period). Otherwise, there is no consistent snapshot in place. The function returns a null value or false if all files in the push class have not managed to make it into the snapshot.

IS_SNAPSHOT_CLASS_PRESENT (snapshot_ID, volume_ID, target_Filer_ID, time_out)

The snapshot_ID is the unique identifier (ID) (per volume) that is returned by the PUSH_SNAPSHOT_CLASS function call when a consistent snapshot has been completed. As noted above, the volume_ID is the shared volume that all the filers must share to perform the consistent push. The target_Filer_ID is the ID of the receiving filer where the snapshot is expected to arrive. As also noted above, the time_out is the optional parameter that caps the amount of time that the system will spend polling for this particular snapshot. The IS_SNAPSHOT_CLASS_PRESENT function call returns true only when the snapshot_ID has arrived at the target (as reflected by the target_Filer_ID). The function preferably includes an implicit polling function that continues to run for a specified, optional time period in order to get ahead on the snapshot merge.

Thus, and as described, typically the push class snapshot is performed on-demand, e.g., when it is desired for data being written locally to be seen on other machines. It is not required that a write on a local filer trigger a push class snapshot.

During a push operation, information other than the file data and metadata itself (from the push class) typically will also be provided from the local filer. For example, if a push class is "all files under /a/b/c," then it will also be necessary to push the directories /a/b, /a and /, to tie in "c" and its children.

The approach herein has numerous benefits. It is simple to deploy, and it operates at scale. It eliminates the need to have additional scripts running in the system to ensure successful consistency of a push. The notification mechanism allows an operator to know when a payload has arrived at the target, and in a consistent manner. The optional time-out functions protect the overall system for being adversely affected by a filer crash or network partition.

As a variant, additional performance improvement may be realized by only pushing the file in the specific class that is needed by clients at the target filers. Another variant is to use the notification mechanism to attempt to synchronize (across the filers) a latest version of metadata.

The query mechanism may be implemented using a conventional transport, e.g., an HTTP or HTTP/S request and response protocol. An alternative messaging mechanism may be stream-based, publish-subscribe based, or the like.

The above-described techniques provide significant advantages, the foremost being the ability to share independent volumes that are established by distinct filers. This conserves storage space in the cloud, does not require the use of shadow volumes, does not require snapshots to alternate between or among filers, facilitates near-live sharing of files even before a snapshot is complete, maintains synchronous snapshot of file system capability, and enables multiple volumes to have independent histories without twice the data being persisted in the cloud.

The filers may be anywhere geographically, and no network connectivity between or among the filers is required (provided filers have a connection to the service).

Sharing enables multi-site access to a single shared volume. The data in the volume is 100% available, accessible, secure and immutable. The approach has infinite scalability and eliminates local capacity constraints. The sites (nodes) may comprise a single enterprise environment (such as geographically-distributed offices of a single enterprise division or department), but this is not a requirement, as filers are not required to comprise an integrated enterprise. This enables partners to share the filesystem (and thus particular volumes therein) in the cloud. Using the service provider-supplied interfaces, which are preferably web-based, the permitted users may set up a sharing group and manage it. Using the sharing approach as described, each member of the sharing group in effect "sees" the same volume. Thus, any point-in-time recovery of the shared volume is provided, and full read/write access is enabled from each node in the sharing group.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be specially constructed for the required purposes, or it may comprise a computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A computer-readable medium having instructions stored thereon to perform the interface functions is tangible.

A given implementation of the disclosed subject matter is software written in a given programming language that runs on a server on an Intel-based hardware platform running an operating system such as Linux. As noted above, the interface may be implemented as well as a virtual machine or appliance, or in any other tangible manner.

While given components of the system have been described separately, one of ordinary skill will appreciate that some of the functions may be combined or shared in given instructions, program sequences, code portions, and the like.

In the preferred approach as described, filers do not communicate directly with one another but, instead, communicate through a hub-and-spoke architecture. Thus, the notification mechanism typically leverages the intermediary (e.g., NMC) for passing the queries and responses, as has been described. In an alternative embodiment, and depending on the underlying architecture, some filer-to-filer communication may be implemented.

Having described our invention, what we claim is as follows:

The invention claimed is:

1. Apparatus associated with a private or public cloud object store in which a volume is being shared among filers across a number of sites, comprising:
   computer hardware; and
   an application programming interface (API) configured as software executed in the computer hardware, the API responsive to receipt from a first function call from a source filer to issue to one or more target filers a second function call, the first function call comprising a source filer identifier identifying the source filer, a volume identifier identifying the volume, and a push class attribute, the push class attribute being either a null value or identifying a set of one or more files that satisfy a user-defined criteria of interest and that comprise a payload configured to be pushed from the source filer to the one or more target filers distinct from any point-in-time snapshot on the volume, the second function call comprising the volume identifier and configured to determine whether a push of the payload has arrived at a particular target filer.

2. The apparatus as described in claim 1 wherein when the push class attribute has the null value, the payload comprises all dirty files present on the source filer.

3. The apparatus as described in claim 1 wherein the API is further configured to provide a notification indicating that the payload has arrived at a particular target filer in a consistent manner.

4. The apparatus as described in claim 1 wherein the first function call also has an associated timeout.

5. The apparatus as described in claim 1 wherein the second function call has an associated timeout.

6. The apparatus as described in claim 1 wherein the user-defined criteria of interest being defined by one of: a directory pattern to follow, and a temporal constraint.

7. The apparatus as described in claim 1 wherein at least one target filer is located remote from the source filer.

8. The apparatus as described in claim 1 wherein the API is configured in a web-accessible management console.

9. The apparatus as described in claim 1 wherein the snapshot is performed on-demand.

10. The apparatus as described in claim 1 wherein the user-defined criteria of interest are a push class.

11. The apparatus as described in claim 1 wherein file data and metadata associated with the one or more files of the push class are pushed from the source filer in respective phases, with the file data being pushed to the cloud during a first phase and the metadata associated with that file data being pushed during a second phase that follows the first phase.

12. A method of data sharing among multiple filers that share a volume in a private or public cloud object store, comprising:
  at a management center:
    receiving a first function call from a source filer, the first function call comprising a source filer identifier identifying the source filer, a volume identifier identifying the volume, and a push class attribute identifying a set of one or more files that satisfy a user-defined criteria of interest and that comprise a payload configured to be pushed from the source filer to the one or more target filers distinct from any point-in-time snapshot on the volume;
    responsive to receipt of the first function call, issuing to the one or more targets a second function call, the second function call comprising the volume identifier and configured to determine whether a push of the payload has arrived at a particular target filer; and
    responsive to the second function call, providing a notification indicating that the payload has arrived at the particular target filer and in a consistent manner.

* * * * *